United States Patent
Taira

(10) Patent No.: US 6,880,361 B2
(45) Date of Patent: Apr. 19, 2005

(54) REFRIGERATING DEVICE

(75) Inventor: Shigeharu Taira, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/740,462

(22) Filed: Dec. 22, 2003

(65) Prior Publication Data

US 2004/0129006 A1 Jul. 8, 2004

Related U.S. Application Data

(62) Division of application No. 10/169,224, filed as application No. PCT/JP00/08952 on Dec. 18, 2000.

(30) Foreign Application Priority Data

Dec. 28, 1999 (JP) .............................. 11-373350
Jul. 31, 2000 (JP) ...................... 2000-230934

(51) Int. Cl.[7] ................................................. F25B 1/00
(52) U.S. Cl. ............................. 62/498; 62/114; 62/115; 62/502; 62/511
(58) Field of Search ........................... 62/114, 115, 467, 62/498, 502, 511; 252/67

(56) References Cited

U.S. PATENT DOCUMENTS

| | | | |
|---|---|---|---|
| 5,711,158 A | * | 1/1998 | Yoshida et al. ................. 62/77 |
| 5,744,053 A | | 4/1998 | Kaimai |
| 6,038,875 A | * | 3/2000 | Haselden ..................... 62/218 |
| 6,074,573 A | | 6/2000 | Kaneko |
| 6,212,903 B1 | * | 4/2001 | Okamoto et al. ............. 62/498 |
| 6,477,848 B1 | * | 11/2002 | Domyo et al. ................ 62/114 |
| 6,550,273 B1 | * | 4/2003 | Fujitaka et al. ............... 62/498 |
| 6,571,575 B1 | * | 6/2003 | Fujitaka et al. ............... 62/511 |

FOREIGN PATENT DOCUMENTS

| | | |
|---|---|---|
| CN | 1178547 A | 4/1998 |
| JP | 9-151370 A | 6/1997 |
| JP | 9-208939 A | 8/1997 |
| JP | 10-195426 A | 7/1998 |
| WO | WO 97/29162 A1 | 8/1997 |
| WO | 98/41803 A1 | 9/1998 |
| WO | 00/52396 A1 | 9/2000 |

OTHER PUBLICATIONS

Shadan Hojin Nippon Reito Kyokai ed. "Jokyu Hyoujun Text Reito Kucho Gijutsu", Jan. 20, 1998, p. 133, right column, line 8 to p. 143, right column, line 26.

* cited by examiner

Primary Examiner—Denise L. Esquivel
Assistant Examiner—Richard L. Leung
(74) Attorney, Agent, or Firm—Birch, Stewart, Kolasch & Birch, LLP

(57) ABSTRACT

An energy-saving refrigerating device is capable of preventing global warming, allowing a communication pipe diameter to be reduced and the number of types of the communication pipe diameters to be reduced while a COP of over the COP obtained when R22 is used is provided by using R32 with small global warming potential (GWP). The refrigerating device includes a compressor, a first heat exchanger, an expansion device, and a second heat exchanger. The diameters of first and second communication pipes are set to ⅜ in. and ⅜ in., respectively, in the refrigerating capacity range of 2.2 to 5.6 kW. The diameters of the first and second communication pipes are set to ⅜ in. and ⅜ in., respectively, in the refrigerating capacity range of 4.5 to 7.1 kW. The diameters of the first and second communication pipes are set to ⅜ in. and ⅝ in., respectively, in the refrigerating capacity range of 7.1 to 14.0 kW.

2 Claims, 5 Drawing Sheets

US 6,880,361 B2

REFRIGERATING DEVICE

This application is a Divisional of co-pending application Ser. No. 10/169,224 filed on Jun. 27, 2002 and for which priority is claimed under 35 U.S.C. § 120. application Ser. No. 10/169,224 is the national phase of PCT International Application No. PCT/JP00/08952 filed on Dec. 18, 2000 under 35 U.S.C. § 371. The entire contents of each of the above-identified applications are hereby incorporated by reference. This application also claims priority of Application Nos. 11-373350 and 2000-230934 both filed in Japan on Dec. 28, 1999 and Jul. 31, 2000, respectively under 35 U.S.C. § 119.

TECHNICAL FIELD

The present invention relates to a refrigerating device and more particularly to a refrigerating device in which R32 (a chemical formula $CH_2F_2$) or mixed refrigerant containing at least 70 percent R32 by weight is used as alternative refrigerant to R22 (a chemical formula $CHClF_2$).

BACKGROUND ART

In a refrigerating device or an air conditioner of split type that execute refrigerating cycles, generally, refrigerant discharged from a compressor is delivered to a first heat exchanger, the refrigerant condensed in the first heat exchanger is expanded by expansion means, and thereafter the refrigerant is delivered to a second heat exchanger through a first communication pipe (This will be referred to as "a liquid pipe," as necessary). Then the refrigerant vaporized in the second heat exchanger is returned to the compressor through a second communication pipe (This will be referred to as "a gas pipe" as necessary).

As well-known, among global environmental problems on refrigerating devices and air conditioners of such a type are (1) ozonosphere protection, (2) energy saving, (3) countermeasures against global warming (reduction of emission of $CO_2$ etc), and (4) reuse (recycling) of resources. Especially, in terms of ozonosphere protection among the global environmental problems, R22 (HFC22) which has conventionally been used is not suitable refrigerant since R22 has a high ODP (Ozone Depletion Potential). For alternative refrigerants to R22 having the high ozone depletion potential, there have been listed R410A (having a composition of HFC32:HFC125=50:50 in weight ratio), R407C (having a composition of HFC32:HFC125: HFC134a=23:25:52 in weight ratio), R32 (HFC32) and the like.

As for energy saving, on the other hand, there is a notice that coefficients of performance (COP) of specified air conditioners must be improved by approximately 4 percent by the end of September, 2004 (Notice No. 190 from the Ministry of International Trade and Industry of Japan, based upon "the Law concerning the Rational Use of Energy") Thus, refrigerant having a large COP value is required to be used from viewpoint of energy saving.

Requirements for prevention of global warming have been getting increasingly stringent. Refrigerating devices and air conditioners are evaluated with use of an index on global warming referred to as TEWI (Total Equivalent Warming Impact). TEWI is represented as the total of an impact of release of refrigerant into the atmosphere (a direct impact) and energy consumption by the device (an indirect impact). The direct impact includes GWP (Global Warming Potential), and the indirect impact includes the inverse of COP. In order to prevent global warming, accordingly, refrigerant having a small GWP value and a large COP value has to be selected so as to decrease TEWI value.

As for above-mentioned GWP, GWP values of R407C and R410A are 1980 and 2340, respectively, and are a little larger than 1900 of R22 GWP value. On the other hand, a GWP value of R32 is 650 and is about one-third of GWP values of R22, R407C, and R410A. That is, R32 having such a small GWP value is extremely effective for prevention of global warming.

As for COP, COP values of R407C. and R410A are generally equivalent to COP value of R22, whereas COP value of R32 larger than that of R22 has not been obtained. In other words, actual COP values of R32 that greatly exceed COP of R22 have not been obtained in the refrigerating devices that execute refrigerating cycles with use of R32, though such devices are theoretically expected to have high COP values in view of characteristics of R32. In such a refrigerating device, on the other hand, there occur phenomena such as increase in pressure and discharge temperature relative to those with use of R22. In addition, slightly flammable R32 has a problem of difficulty in establishing a consensus on safety thereof. Therefore, the industrial world has not employed R32 as alternative refrigerant for actual products.

In room air conditioners with refrigerating capacity between 2.2 kW class and 5.0 kW class in which e.g. conventional R22 refrigerant is used, a diameter of liquid pipe is set to ⅔" as shown by a reference character L01 in FIG. 2, and diameters of gas pipe are set to ⅜" and ⅛" as shown by reference characters G01 and G02 in FIG. 3, respectively. Herein, diameters of pipes are represented by nominal diameters on inch system with use of a symbol ". In packaged air conditioners with refrigerating capacity between 4.5 kW class and 14.0 kW class in which conventional R22 refrigerant is used, diameters of liquid pipe are set to ⅔" and ⅜" as shown by reference characters L01 and L02 in FIG. 2, and diameters of gas pipe are set to ⅛", ⅝" and ⅝" as shown by reference characters G02, G03 and G04 in FIG. 3. As apparent from the above figures, diameters of liquid pipe and gas pipe tend to be set larger with increase in refrigerating capacity. This is because the flow rate i.e. velocity of refrigerant increases and thereby pressure loss increases in a pipe having a same diameter.

The larger a diameter of a pipe is, however, the more extensive and the more difficult piping work such as connection of and work on the pipe is. On the other hand, a large number of types of pipe cause a problem of bothersome production control of air conditioners. The same goes for devices in which R410A, R407C or the like is used as refrigerant in place of R22.

DISCLOSURE OF INVENTION

An object of the present invention is to provide an energy-saving type refrigerating device capable of preventing global warming, allowing communication pipe diameters to be reduced and the number of types of the communication pipe diameters to be reduced while COP of over COP obtained when R22 is used is provided by using, as refrigerant, R32 with small global warming potential (GWP).

The invention was created on basis of finding by the inventor that tendencies of change in COP of refrigerating devices with respect to quantity of refrigerant (total quantity for filling a refrigerant circuit) greatly differ among types of refrigerant, i.e., between R32 and other refrigerants such as R410A. That is, in use of R410A for example, COP tends to increase gradually and to seem to become saturated with increase in the quantity of refrigerant in a range shown in the drawing as shown in FIG. 4A. In use of R32, by contrast, COP has its peak relative to change in the quantity of refrigerant and tends to decrease as the quantity of refrigerant departs from a range thereof which provides the peak. The reason why COP obtained with use of R32 have not exceeded COP obtained with use of R410A is that quantities of refrigerant have been in a comparatively high range (from 1200 to 1300 g in an example of FIG. 4A). An observable fact is that the peak value of COP obtained by changing the quantity of refrigerant with use of R32 is much higher than COP with use of R410A in an optimal quantity of refrigerant (1300 g in the example of FIG. 4A). Another observable fact is that the quantity of refrigerant (960 g in the example of FIG. 4A) providing the peak of COP in the case of R32 is far smaller than the optimal quantity of refrigerant (1300 g in the example of FIG. 4A) in the case of R410A. Accordingly, there is a possibility that R32 reduces communication pipe diameters or the number of types of the communication pipe diameters in a range where COP is not smaller than conventional COP obtained in the case of using R22.

The present invention provides a refrigerating device for delivering refrigerant discharged from a compressor to a first heat exchanger, expanding the refrigerant condensed in the first heat exchanger by expanding means, thereafter delivering the refrigerant through a first communication pipe to a second heat exchanger, and returning the refrigerant vaporized in the second heat exchanger through a second communication pipe to the compressor, wherein R32 is used as the refrigerant, and diameters of the first communication pipe and the second communication pipe are set to 2/8 inch and 3/8 inch, respectively, in a refrigerating capacity range of 2.2 to 5.6 kW.

Herein, a method of measuring refrigerating capacity (kW) complies with stipulations of Japanese Industrial Standard (JIS) C9612 (the same goes for the entirety of this specification).

In the refrigerating device, R32 is used as refrigerant and the diameters of the first communication pipe (liquid pipe) and the second communication pipe (gas pipe) are set to 2/8" and 3/8", respectively, in the refrigerating capacity range of 2.2 to 5.6 kW. The diameter of the first communication pipe is the same as that in conventional devices, but the diameter of the second communication pipe is reduced in comparison with the diameters (including 4/8") in the conventional devices because the diameter of the second communication pipe is set only to 3/8". The diameters of the first communication pipe and the second communication pipe are respectively set to one type in the refrigerating capacity range of 2.2 to 5.6 kW. Thus, the number of types of the diameters of the communication pipes is reduced in comparison with that in the conventional devices. As a result, production control of refrigerating devices is facilitated. Besides, COP equivalent to or larger than COP obtained in the case of R22 is obtained by optimizing a quantity of refrigerant.

The present invention also provides a refrigerating device for delivering refrigerant discharged from a compressor to a first heat exchanger, expanding the refrigerant condensed in the first heat exchanger by expanding means, thereafter delivering the refrigerant through a first communication pipe to a second heat exchanger, and returning the refrigerant vaporized in the second heat exchanger through a second communication pipe to the compressor, wherein R32 is used as the refrigerant, and diameters of the first communication pipe and the second communication pipe are set to 2/8 inch and 4/8 inch, respectively, in a refrigerating capacity range of 4.5 to 7.1 kW.

In this refrigerating device, R32 is used as refrigerant and the diameters of the first communication pipe (liquid pipe) and the second communication pipe (gas pipe) are set to 2/8" and 4/8", respectively, in the refrigerating capacity range of 4.5 to 7.1 kW. The diameter of the first communication pipe is reduced in comparison with the diameters (including 3/8") in the conventional devices because the diameter of the first communication pipe is set only to 2/8". Besides, the diameter of the second communication pipe is reduced in comparison with the diameters (including 5/8") in the conventional devices because the diameter of the second communication pipe is set only to 4/8". The number of types of the diameters of the communication pipes is reduced in comparison with that in the conventional devices because the diameters of the first communication pipe and the second communication pipe are respectively set to one type in the refrigerating capacity range of 4.5 to 7.1 kW. As a result, production control of refrigerating devices is facilitated. Besides, COP equivalent to or larger than COP obtained in the case of R22 is obtained by optimizing a quantity of refrigerant.

The present invention also provides a refrigerating device for delivering refrigerant discharged from a compressor to a first heat exchanger, expanding the refrigerant condensed in the first heat exchanger by expanding means, thereafter delivering the refrigerant through a first communication pipe to a second heat exchanger, and returning the refrigerant vaporized in the second heat exchanger through a second communication pipe to the compressor, wherein R32 is used as the refrigerant, and diameters of the first communication pipe and the second communication pipe are set to 2/8 inch and 5/8 inch, respectively, in a refrigerating capacity range of 7.1 to 14.0 kW.

In this refrigerating device, R32 is used as refrigerant and the diameters of the first communication pipe (liquid pipe) and the second communication pipe (gas pipe) are set to 2/8" and 5/8", respectively, in the refrigerating capacity range of 7.1 to 14.0 kW. The diameter of the first communication pipe is the same as that in conventional devices, but the diameter of the second communication pipe is reduced in comparison with the diameters (including 6/8") in the conventional devices because the diameter of the second communication pipe is set only to 5/8". The diameters of the first communication pipe and the second communication pipe are respectively set to one type in the refrigerating capacity range of 7.1 to 14.0 kW. Thus, the number of types of the diameters of the communication pipes is reduced in comparison with that in the conventional devices. As a result, production control of refrigerating devices is facilitated. Besides, COP equivalent to or larger than COP obtained in the case of R22 is obtained by optimizing a quantity of refrigerant.

In one embodiment of the present invention, mixed refrigerant containing at least 70 percent R32 by weight is used as the refrigerant in place of single refrigerant of R32.

Principle of the invention may be applied not only to single refrigerant of R32 but extensively to mixed refrigerant containing at least 70 percent R32 by weight while functions and effects similar to those described above are achieved.

BRIEF DESCRIPTION OF DRAWINGS

FIG. 4A shows results upon a cooling operation, and FIG. 4B shows results upon a heating operation.

BEST MODE FOR CARRYING OUT THE INVENTION

Figure 1:
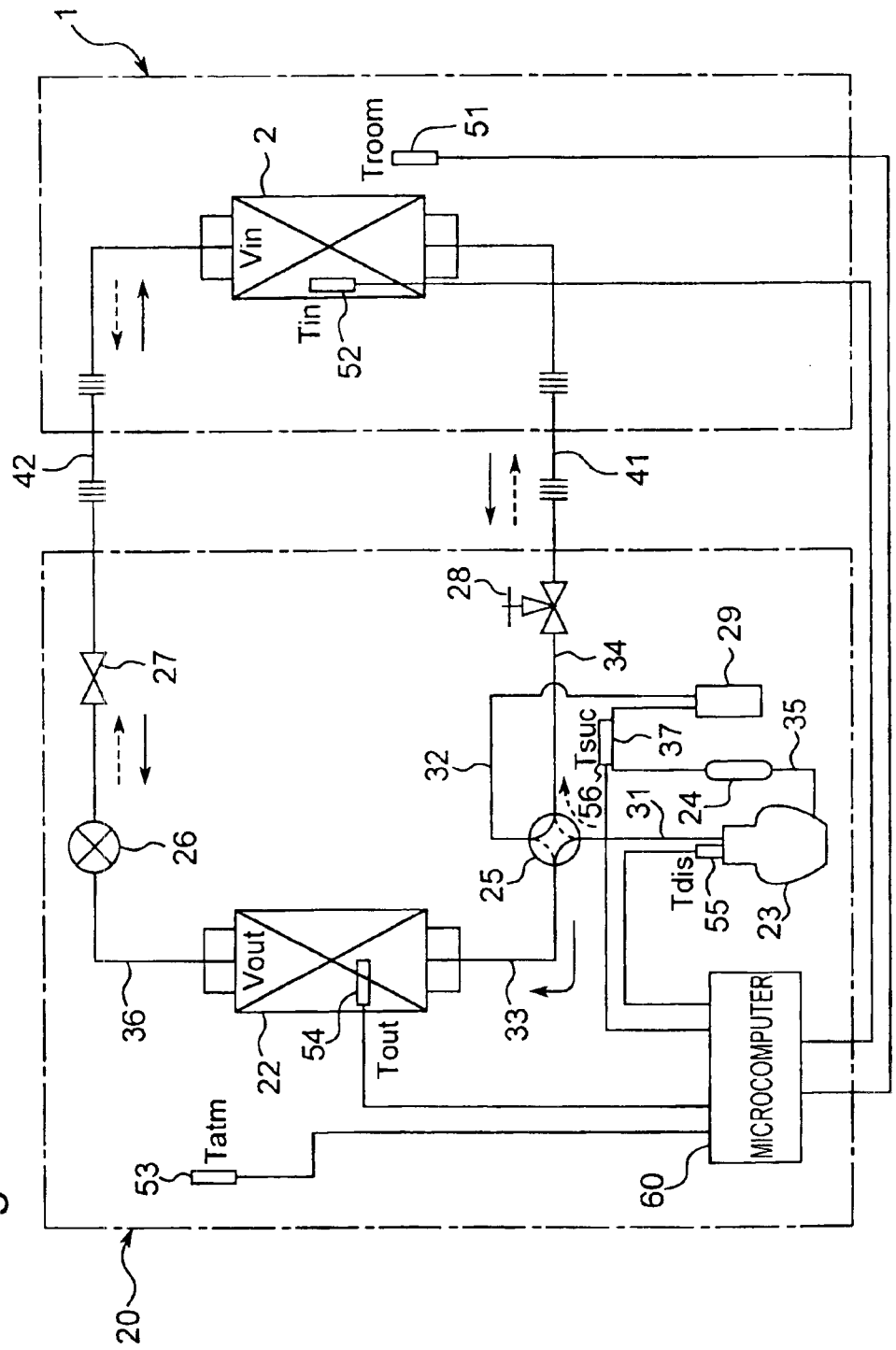
FIG. 1 is a schematic configuration of an air conditioner for explaining the present invention.

Hereinbelow, a refrigerating device of the invention will be described in detail with reference to a preferred embodiment shown in the drawings.

FIG. 1 shows a schematic configuration of an air conditioner for explaining the invention. In the air conditioner, a refrigerant circuit is composed of an outdoor unit 20 and an indoor unit 1 that are connected to each other by refrigerant pipes 41 and 42, wherein R32 as refrigerant is circulated through the refrigerant circuit. In the indoor unit 1, an indoor heat exchanger 2 is housed as a second heat exchanger. In the outdoor unit 20, there are housed a compressor 23 for compressing and discharging refrigerant (R32), a four-way valve 25 for switching refrigerant passages, an outdoor heat exchanger 22 as a first heat exchanger, a motor-operated expansion valve 26, an accumulator 24 for gas-liquid separation of returned refrigerant, a receiver 29 for adjusting quantity of refrigerant for cooling and heating, and a microcomputer 60 for controlling operations of the air conditioner.

In a cooling operation in which refrigerating cycles are executed, as shown by solid lines in FIG. 1, by changing over a setting of the four-way valve 25, refrigerant discharged from the compressor 23 is delivered through a pipe 31, the four-way valve 25, and a pipe 33 to the outdoor heat exchanger 22 functioning as a condenser. The refrigerant condensed in the outdoor heat exchanger 22 is delivered through a pipe 36, the motor-operated expansion valve 26 that throttles a passage to expand refrigerant, a throttle valve 27, and the first communication pipe 42 to the indoor heat exchanger 2 functioning as an evaporator. Further, the refrigerant vaporized in the indoor heat exchanger 2 is returned through the second communication pipe 41, a needle valve 28, a pipe 34, the four-way valve 25, a pipe 32, the receiver 29, a pipe 37, the accumulator 24, and a pipe 35 to the compressor 23. In a heating operation in which heat pump cycles are executed, as shown by dashed lines in FIG. 1, by switching over the four-way valve 25, refrigerant discharged from the compressor 23 is delivered through the pipe 31, the four-way valve 25, the pipe 34, the needle valve 28, and the second communication pipe 41, to the indoor heat exchanger 2 functioning as a condenser. The refrigerant condensed in the indoor heat exchanger 2 is delivered to the first communication pipe 42, the throttle valve 27, the motor-operated expansion valve 26 being completely open, the pipe 36, and the outdoor heat exchanger 22 functioning as an evaporator. Further, the refrigerant vaporized in the outdoor heat exchanger 22 is returned through the pipe 33, the four-way valve 25, the pipe 32, the receiver 29, the pipe 37, the accumulator 24, and the pipe 35 to the compressor 23.

The indoor unit 1 is provided with a temperature sensor 51 for detecting an indoor atmospheric temperature Troom and a temperature sensor 52 for detecting an indoor heat exchanger temperature Tin. The outdoor unit 20 is provided with a temperature sensor 53 for detecting an outdoor atmospheric temperature Tatm, a temperature sensor 54 for detecting an outdoor heat exchanger temperature Tout, a temperature sensor 55 for detecting a compressor discharge temperature Tdis, and a temperature sensor 56 for detecting a compressor suction temperature Tsuc. The microcomputer 60 controls operations of the refrigerant circuit on the basis of output from the temperature sensors or settings by a user.

In the air conditioner, as described above, R32 is used as refrigerant. Besides, in a refrigerating capacity range of 2.2 to 5.6 kW, a diameter of the first communication pipe (liquid pipe) 42 is set to ⅖" as shown by a reference character L11 in FIG. 2, and a diameter of the second communication pipe (gas pipe) 41 is set to ⅜" as shown by a reference character G11 in FIG. 3. With this configuration, in the refrigerating capacity range of 2.2 to 5.6 kW, the diameter of the first communication pipe 42 is the same as that in conventional devices, but the diameter of the second communication pipe 41 is reduced in comparison with the diameters (including ⅘") in the conventional devices. This is because the diameter of the second communication pipe 41 is set only to ⅜". In addition, the diameters of the first communication pipe 42 and the second communication pipe 41 are respectively set to one type over the refrigerating capacity range of 2.2 to 5.6 kW. Therefore, the numbers of types of the diameters of the communication pipes 41 and 42 are reduced in comparison with those (two types of liquid pipe, two types of gas pipe, four types in total) in the conventional devices. As a result, it is facilitated to perform production control of air conditioners, room air conditioners in particular. Besides, COP not smaller than COP with use of R22 is obtained by optimizing the quantity of refrigerant.

Figure 4A:
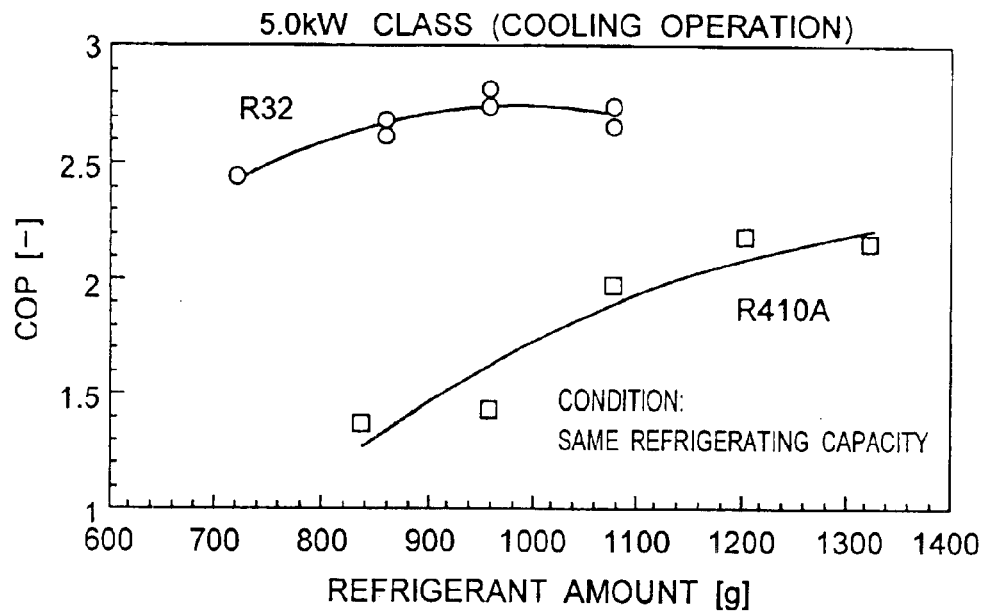
FIGS. 4A and 4B show results of measurement of a COP when R32 is used as a refrigerant and a COP when R410A is used while the refrigerant amount (total amount filled in the refrigerant circuit) is changed.
Figure 4B:
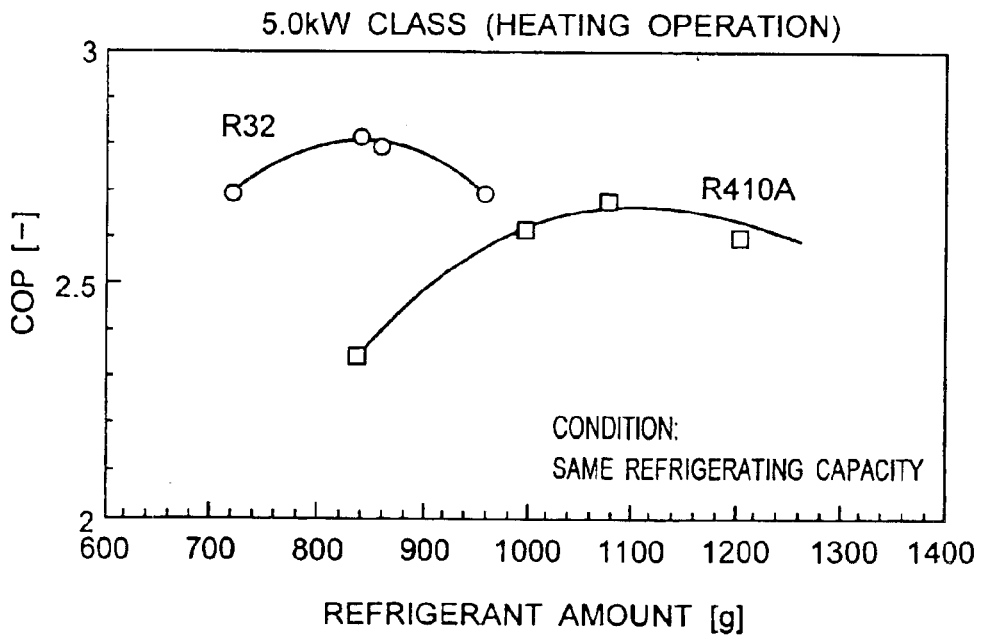

For example, FIGS. 4A and 4B show results of measurement of COP with use of R32 as refrigerant and COP with use of R410A (having a peak value equivalent to COP with use of R22) with variation in quantity of refrigerant (total quantity for filling a refrigerant circuit) for a room air conditioner having a refrigerating capacity of 5.0 kW class. FIG. 4A shows the results in cooling operations and FIG. 4B shows the results in heating operations. On condition that the quantity of refrigerant is set in a range from a quantity of 840 g providing a peak of COP in heating operations to a quantity of 960 g providing a peak of COP in cooling operations, COP not smaller than COP with use of R410A (having a peak value equivalent to COP with use of R22) can be obtained in both cooling and heating operations.

Figure 2:
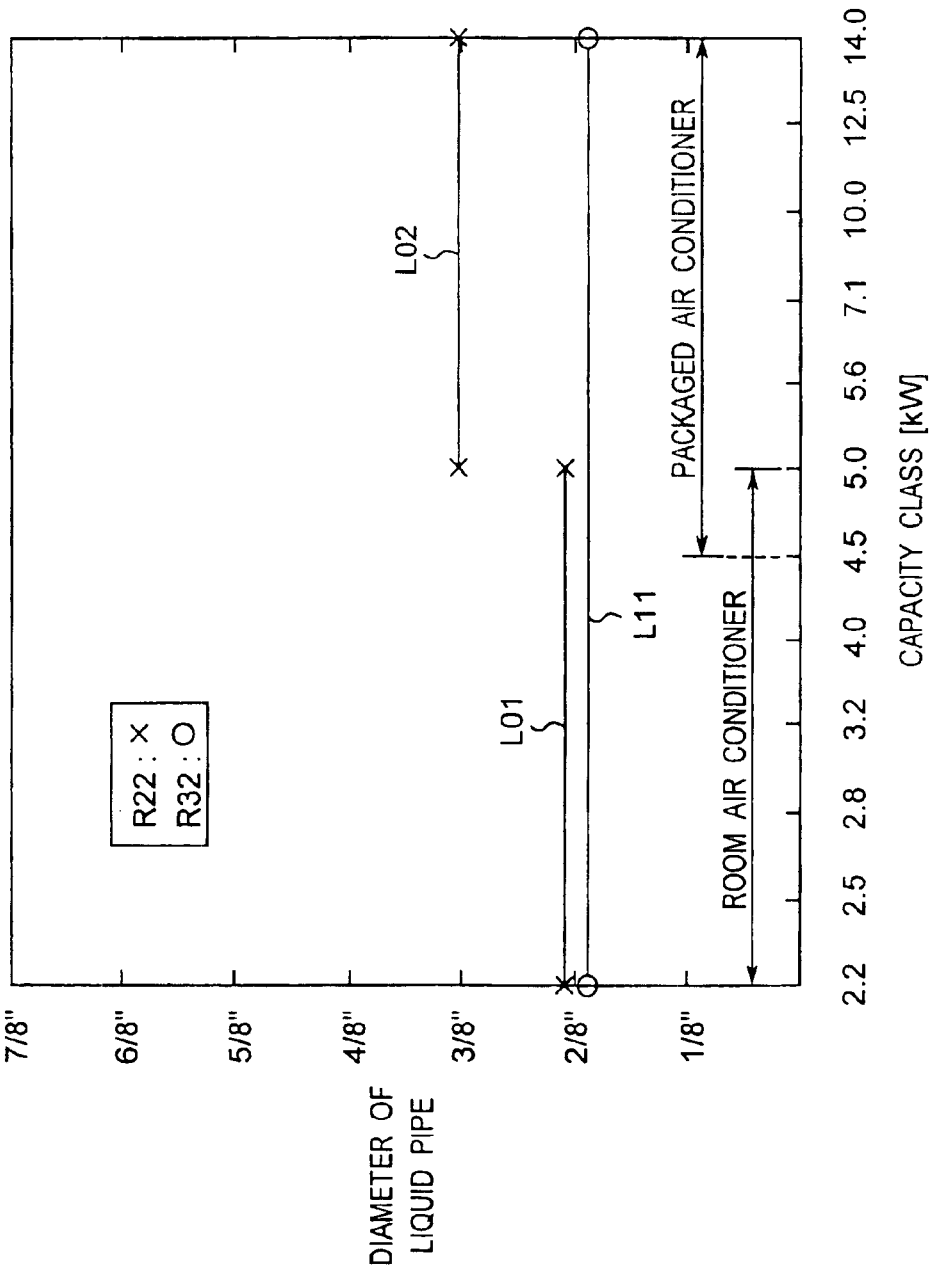
FIG. 2 is a diagram showing relationship between a refrigerating capacity class and a set diameter of liquid pipe by comparison between a case of R32 according to the invention and a case of R22.
Figure 3:
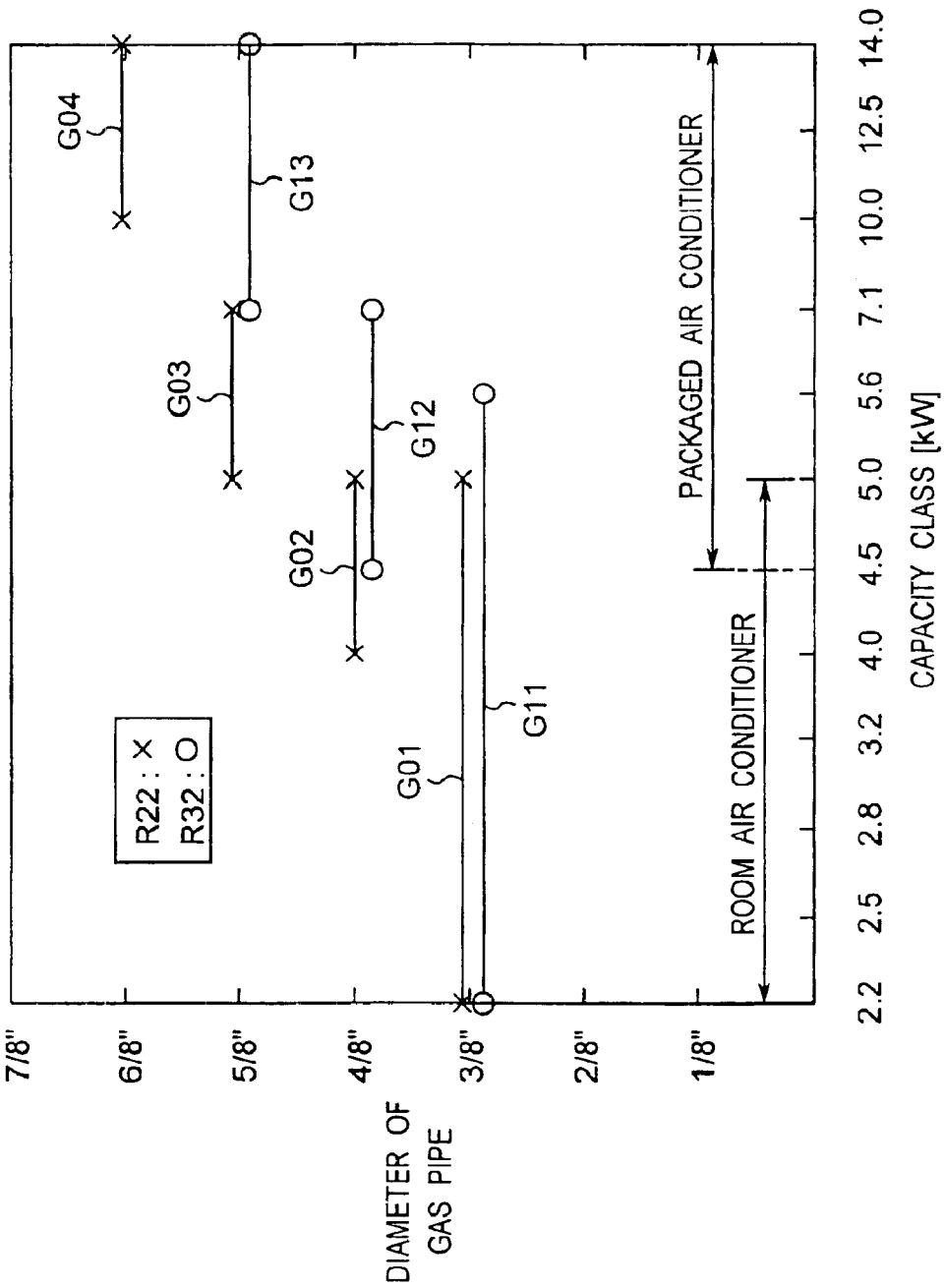
FIG. 3 is a diagram showing relationship between a refrigerating capacity class and a set diameter of gas pipe by comparison between a case of R32 according to the invention and a case of R22.

In a refrigerating capacity range of 4.5 to 7.1 kW, a diameter of the first communication pipe (liquid pipe) 42 is set to ⅖" as shown by the reference character L11 in FIG. 2, and a diameter of the second communication pipe (gas pipe) 41 is set to ⅘" as shown by a reference character G12 in FIG. 3. With this configuration, the diameter of the first communication pipe 42 is set only to ⅖" in the refrigerating capacity range of 4.5 to 7.1 kW, and is therefore reduced in comparison with the diameters (including ⅜") in the conventional devices. Besides, the diameter of the second communication pipe 41 is set only to ⅘" and is therefore reduced in comparison with the diameters (including ⅝") in the conventional devices. The diameters of the first communication pipe 42 and the second communication pipe 41 are respectively set to one type over the refrigerating capacity range of 4.5 to 7.1 kW. Thus, the numbers of types of the diameters of the communication pipes 41 and 42 are reduced in comparison with those (two types of liquid pipe, two types of gas pipe, four types in total) in the conventional devices. As a result, it is facilitated to perform production control of air conditioners, in particular, packaged air conditioners having refrigerating capacity between 4.5 kW and 7.1 kW. Besides, COP not smaller than COP with use of R22 is obtained by optimizing the quantity of refrigerant.

In a refrigerating capacity range of 7.1 to 14.0 kW, a diameter of the first communication pipe (liquid pipe) 42 is set to ⅜" as shown by the reference character L11 in FIG. 2, and a diameter of the second communication pipe (gas pipe) 41 is set to ⅝" as shown by a reference character G13 in FIG. 3. With this configuration, in the refrigerating capacity range of 7.1 to 14.0 kW, the diameter of the first communication pipe 42 is the same as that in conventional devices, but the diameter of the second communication pipe 41 is reduced in comparison with the diameters (including ⅞") in the conventional devices. This is because the diameter of the second communication pipe 41 is set only to ⅝". Besides, the diameters of the first communication pipe 42 and the second communication pipe 41 are respectively set to one type over the refrigerating capacity range of 7.1 to 14.0 kW. Thus, the numbers of types of the diameters of the communication pipes 41 and 42 are reduced in comparison with those (one type of liquid pipe, two types of gas pipe, three types in total) in the conventional devices. As a result, it is facilitated to perform production control of air conditioners, in particular, packaged air conditioners having refrigerating capacity between 7.1 kW and 14.0 kW. Besides, COP not smaller than COP with use of R22 is obtained by optimizing the quantity of refrigerant.

The embodiment has been described with reference to the air conditioners, yet is not limited to those, as a matter of course. The invention may widely be applied to refrigerating devices that execute refrigerating cycles with use of R32 as refrigerant.

Principle of the invention, as a matter of course, may be applied not only to single refrigerant of R32 but extensively to mixed refrigerant containing at least 70 percent R32 by weight so that similar functions and effects are achieved. As refrigerant other than R32, fluoric refrigerant and natural refrigerant may be employed. Natural refrigerant includes propane, butane, $CO_2$, and ammonia. An example of such mixed refrigerant contains 70 to 90% R32 by weight and $CO_2$ as the remaining component. At the time of so-called retrofit when an old-type refrigerating device is filled with R32 as alternative refrigerant or at the time of service for R22 machine, there may be used such mixed refrigerant as contains 70 to 90% R32 by weight and R22 as the remaining component.

As mixed refrigerant is conceivable a mixture of R32 and R125. As for the mixed refrigerant of R32 and R125, an R32 content range of up to 70 percent by weight is an azeotropic region in which composition of liquid and composition of generated vapor are the same, and an R32 content range not smaller than 70 percent is a nonazeotropic region. The characteristics of R32 appear clearly with increase in content of R32, and the characteristics of R32 appear further conspicuously in the nonazeotropic region.

Figure 5:
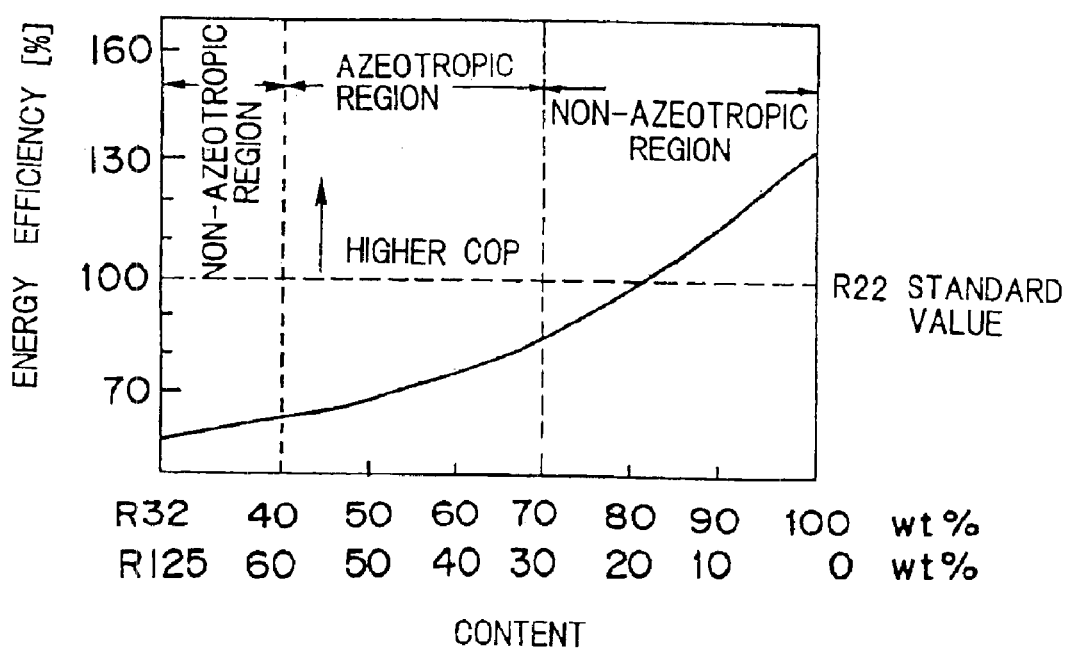
FIG. 5 is relationship between energy efficiency and content of R32 in a mixed refrigerant of R32 and R125.

FIG. 5 shows a relationship between R32 content in mixed refrigerant of R32 and R125 and energy efficiency. R32 content not less than 70 percent by weight causes a remarkable increase in energy efficiency. R32 content larger than the vicinity of 80 percent by weight causes energy efficiency to exceed that of R22. That is, R32 content not less than 70 percent by weight makes it possible to obtain a high COP.

In this manner, as shown in FIG. 5, single refrigerant of R32 and mixed refrigerant containing at least 70 percent R32 by weight make COP generally equivalent to or larger than that provided by conventional refrigerant such as R22.

R32 has an extremely small global warming potential (GWP) that is about one-third that of conventional refrigerant such as R22, and R32 has a high COP in comparison with that of conventional refrigerant. Therefore, R32 has a total equivalent warming impact (TEWI) smaller than TEWI of R22, R410A and the like (decrease rate of 10 to 20%), and thereby R32 exhibits excellent characteristics on global warming.

According to the refrigerating device of the invention, as is evident from above description, communication pipe diameters and the number of types thereof can be reduced by using refrigerant R32 while COP not smaller than COP obtained in the case of R22 is obtained in the refrigerating capacity range of 2.2 to 5.6 kW.

According to the refrigerating device of the invention, communication pipe diameters and the number of types thereof may be similarly reduced by using refrigerant R32 while COP not smaller than COP obtained in the case of R22 is obtained in the refrigerating capacity range of 4.5 to 7.1 kW.

According to the refrigerating device of the invention, communication pipe diameters and the number of types thereof may be similarly reduced by using refrigerant R32 while COP not smaller than COP obtained in the case of R22 is obtained in the refrigerating capacity range of 7.1 to 14.0 kW.

In the refrigerating device of the invention, mixed refrigerant containing at least 70 percent R32 by weight is used as the refrigerant, and therefore functions and effects similar to those described above can be achieved.

What is claimed is:

1. A refrigerating device, comprising:
   a pipe for delivering refrigerant discharged from a compressor to a first heat exchanger;
   an expanding device for expanding the refrigerant condensed in the first heat exchanger;
   a first communication pipe for delivering the refrigerant expanding in the expanding device to a second heat exchanger; and
   a second communication pipe for returning the refrigerant vaporized in the second heat exchanger to the compressor, wherein
   a single refrigerant R32 is used as the refrigerant, and
   diameters of the first communication pipe and the second communication pipe are set to ⅖ inch and ⅜ inch, respectively, in a refrigerating capacity over an entire range of 2.2 to 3.9 kW.

2. A refrigerating device, comprising:
   a pipe for delivering refrigerant discharged from a compressor to a first heat exchanger;
   an expanding device for expanding the refrigerant condensed in the first heat exchanger
   a first communication pipe for delivering the refrigerant expanding in the expanding device to a second heat exchanger; and
   a second communication pipe for returning the refrigerant vaporized in the second heat exchanger to the compressor, wherein
   mixed refrigerant containing at least 70 percent R32 by weight is used as the refrigerant; and
   diameters of the first communication pipe and the second communication pipe are set to ⅖ inch and ⅜ inch, respectively, in a refrigerating capacity over an entire range of 2.2 to 3.9 kW.

* * * * *